United States Patent [19]

Grove et al.

[11] Patent Number: 5,263,329
[45] Date of Patent: Nov. 23, 1993

[54] FLOW MANAGEMENT APPARATUS FOR CRYOGENIC LIQUID

[75] Inventors: R. K. Grove, Los Altos; Ronald W. King, San Francisco; Julie M. L'Heureux, Santa Clara, all of Calif.

[73] Assignee: Lockheed Missiles & Space Company, Inc., Sunnyvale, Calif.

[21] Appl. No.: 812,145

[22] Filed: Dec. 23, 1991

Related U.S. Application Data

[63] Continuation-in-part of Ser. No. 810,050, Dec. 19, 1991.

[51] Int. Cl.⁵ .............................. F17C 7/02
[52] U.S. Cl. ...................... 62/50.1; 60/257; 137/590; 220/901; 244/135 R; 244/135 C
[58] Field of Search .................. 55/159, 182; 60/257, 60/259; 62/50.1, 50.2, 50.4, 50.7, 45.1; 137/154, 590, 574; 285/41, 47, 133.1, 904; 220/901; 244/135, 172

[56] References Cited

U.S. PATENT DOCUMENTS

| | | | |
|---|---|---|---|
| 3,202,160 | 8/1965 | Barger | 137/590 |
| 3,433,028 | 3/1969 | Klee | 62/50.7 |
| 3,486,302 | 12/1969 | Paynter | 62/50.1 |
| 3,854,905 | 12/1974 | Balzer et al. | 55/159 |
| 3,972,202 | 8/1976 | Stearns | 62/50.1 |
| 4,168,718 | 9/1979 | Hess et al. | 137/590 |
| 4,272,257 | 6/1981 | Ellion et al. | 55/159 |
| 4,399,831 | 8/1983 | Robert | 137/590 |
| 4,715,399 | 12/1987 | Jaekle, Jr. et al. | 137/590 |
| 4,733,531 | 3/1988 | Grove | 137/590 |
| 4,743,278 | 5/1988 | Yeh | 55/182 |
| 4,768,541 | 9/1988 | Uney et al. | 137/154 |
| 4,901,762 | 2/1990 | Miller, Jr. et al. | 137/590 |
| 4,976,398 | 12/1990 | Bruhn | 244/135 |

FOREIGN PATENT DOCUMENTS

| | | | |
|---|---|---|---|
| 705531 | 5/1941 | Fed. Rep. of Germany | 62/50.7 |
| 106798 | 6/1984 | Japan | 62/50.7 |

Primary Examiner—Harold J. Tudor
Attorney, Agent, or Firm—John J. Morrissey

[57] ABSTRACT

In a tank 10 for cryogenic liquid to be used in a low-gravity environment (e.g., on a space vehicle), a liquid transfer apparatus 15 (which comprises an elongate array of fins 32 and a sponge structure formed from panels 31) functions to transfer cryogenic liquid from the interior of the tank 10 to a bowl structure 20 defining a reservoir region adjacent an outlet of the tank 10. A perforated plate 22 disposed between the sponge structure and the outlet of the tank 10 causes cryogenic liquid to pass through the outlet into an outlet line 40 in a regular and generally unbroken flow. To prevent any substantial amount of heat transfer into the reservoir region of the tank 10, the bowl structure 20 is separated from the inner surface of the tank 10 by a capillary distance in order to provide a thermally insulating space therebetween. A well for cryogenic fluid, which is in communication with the thermally insulating space between the bowl structure 20 and the inner surface of the tank 10, is formed around an outlet duct 21 leading from the bowl structure 20 in order to prevent any significant transfer of heat into cryogenic liquid that is being withdrawn from the tank 10 through the outlet duct 21.

7 Claims, 1 Drawing Sheet

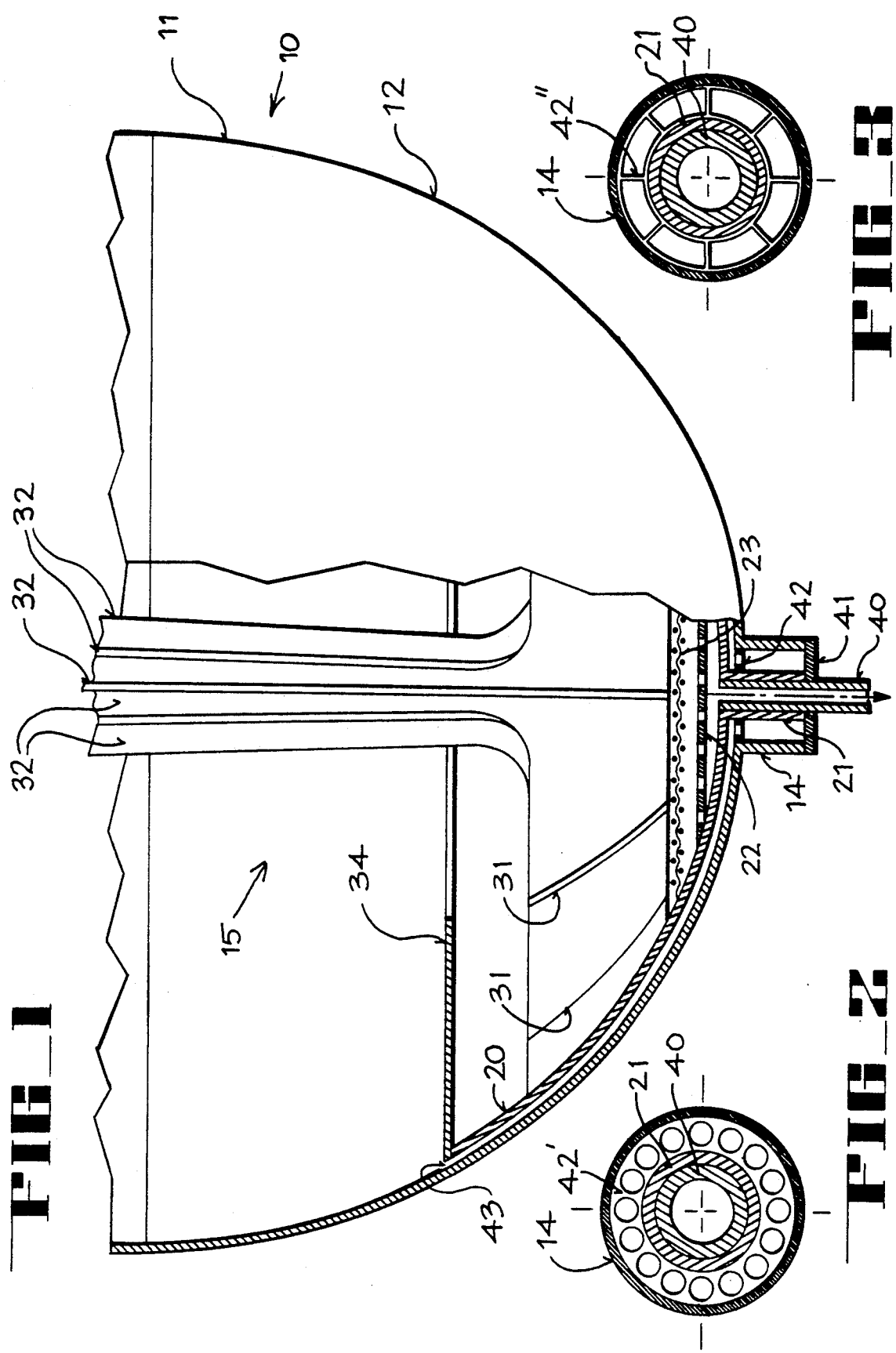

FLOW MANAGEMENT APPARATUS FOR CRYOGENIC LIQUID

This application is a continuation-in-part of patent application Ser. No. 07/810,050 filed on Dec. 19, 1991.

TECHNICAL FIELD

This invention pertains generally to liquid management systems for use in low-gravity environments, and more particularly to a flow management apparatus for a cryogenic liquid on board a space vehicle.

BACKGROUND OF THE INVENTION

In co-pending U.S. patent application Ser. No. 07/810,050, which is incorporated herein by reference, an apparatus is disclosed that is operable in a low-gravity environment (e.g., on board a space vehicle) for enabling liquid to be withdrawn through an outlet of a tank at a controlled rate.

The apparatus disclosed in co-pending U.S. patent application Ser. No. 07/810,050 enables liquid to be withdrawn in a regular and substantially unbroken flow at a controlled rate, without entrapment of gas and/or vapor bubbles therein, from a tank on a space vehicle. However, where the liquid in the tank is a cryogenic liquid (e.g., liquid oxygen or liquid hydrogen), a modification of the apparatus disclosed in co-pending U.S. patent application Ser. No. 07/810,050 would be advantageous in minimizing heat transfer into the liquid that is being withdrawn from the tank.

SUMMARY OF THE INVENTION

It is a general object of the present invention to provide an apparatus operable in a low-gravity environment for enabling a cryogenic liquid to be withdrawn through an outlet of a tank at a controlled rate with minimal transfer of heat to the cryogenic liquid that is being withdrawn from the tank.

It is a specific object of the present invention to provide a modification of the apparatus described in co-pending U.S. patent application Ser. No. 07/810,050 to accommodate a cryogenic liquid.

In accordance with the present invention, a well structure containing cryogenic fluid surrounds the outlet duct.

DESCRIPTION OF THE DRAWING

FIG. 1 is a longitudinal cross-sectional view of an outlet portion of a cryogenic liquid tank containing flow management apparatus according to the present invention.

FIG. 2 is a plan view of a first embodiment of a thermally insulating support member for use in the cryogenic liquid tank of FIG. 1.

FIG. 3 is a plan view of a second embodiment of a thermally insulating support member for use in the cryogenic liquid tank of FIG. 1.

Best Mode of Carrying Out the Invention

Reference is made to co-pending U.S. patent application Ser. No. 07/810,050 for a description of a liquid management apparatus for use on a spacecraft. The present invention involves a modification of the apparatus described in U.S. patent application Ser. No. 07/810,050.

In FIG. 1, a reservoir region adjacent the outlet of a cryogenic liquid tank 10 is illustrated. The tank 10 is generally elongate with a circularly cylindrical central section 11, and with enclosing end sections of hemispherical configuration attached (as by welding) at corresponding ends of the central section 11. Only an end section 12, which defines an outlet end of the tank 10, is shown in FIG. 1. An aperture at the apex of the hemispherical end section 12 is used for filling the tank 10 with cryogenic liquid, and for draining cryogenic liquid from the tank 10. An aperture at the apex of the other hemispherical end section (not seen in the portional view of FIG. 1) enables gas, and/or vapor of the cryogenic liquid in the tank 10, to be vented from the tank 10 when the tank 10 is being filled with the cryogenic liquid. An outlet conduit 14, which is integral with the end section 12, leads from the aperture at the apex of the end section 12. In operation, cryogenic liquid is withdrawn as needed from the tank 10 through the aperture at the apex of the end section 12.

A liquid transfer apparatus 15 is mounted within the tank 10 to gather cryogenic liquid for transport by capillary action to the reservoir region adjacent the aperture at the apex of the hemispherical end section 12. The liquid transfer apparatus 15 comprises a sponge portion that is fitted into the reservoir region of the tank 10, and an elongate gathering portion that extends from the sponge portion away from the reservoir region into a remote region of the tank 10. The gathering portion of the liquid transfer apparatus 15 could be of any appropriate type, and is illustrated by way of example in FIG. 1 as being of the type described in the first embodiment that is disclosed in co-pending U.S. patent application Ser. No. 07/810,050.

The sponge portion of the liquid transfer apparatus 15 comprises a bowl structure 20, which has an outer surface that is contoured generally in conformity with the contour of the inner surface of the hemispherical end section 12. However, the outer surface of the bowl structure 20 does not fit against the inner surface of the end section 12 (as described in co-pending U.S. patent application Ser. No. 07/810,050, but instead is separated by a capillary distance from the inner surface of the end section 12 so as to form a thermally insulating space between the bowl structure 20 and the inner surface of the end section 12. The space between the bowl structure 20 and the inner surface of the end section 12 is in capillary-flow communication with the interior of the tank 10, as shown in FIG. 1.

An outlet duct 21, which is integral with the bowl structure 20, leads from an aperture at a bottom portion of the bowl structure 20 and extends coaxially through the outlet conduit 14 at the apex of the hemispherical end section 12. According to the present invention, the outlet conduit 14 leading from the end section 12 is wider than the outlet duct 21 leading from the bowl structure 20 so as to enable a well containing cryogenic liquid to be formed around the outlet duct 21—i.e., between the outer surface of the outlet duct 21 and the inner surface of the outlet conduit 14. This well is in communication with the interior of the tank 10 via the space between the outer surface of the bowl structure 20 and the inner surface of the end section 12.

A perforated circular plate 22, whose function as a flow-control device is described in co-pending U.S. patent application Ser. No. 07/810,050 is secured (as by welding) to the inner surface of the bowl structure 20 adjacent the aperture at the bottom portion thereof so as to repose generally orthogonally with respect to the outlet duct 21. A circular screen 23 with capillary-size openings, whose function as a gas barrier is described in co-pending U.S. patent application Ser. No. 07/810,050, is secured (as by welding) to the inner surface of the bowl structure 20 further away than the perforated plate 22 from the outlet duct 21, so that the perforated plate 22 is disposed between the screen 23 and the outlet duct 21.

An array of panels 31 is secured to the inner surface of the bowl structure 20 adjacent the screen 23, so that the screen 23 is disposed between the panels 31 and the perforated plate 22. Proximal edges of the panels 31 are attached to each other (as by welding) so that the panels 31 extend radially outward at substantially equal angular intervals from a common axis, which is coincident with the axis of the outlet duct 21. As shown in FIG. 1, the gathering portion of the liquid transfer apparatus 15 comprises an array of elongate fins 32 extending out of the bowl structure 20 from the panels 31 into the remote region of the tank 10. The fins 32 could be integral extensions of some of the panels 31, or could be separate structural entities attached to the array of panels 31.

An annular lid 34 is secured (as by welding) to a circular rim portion of the bowl structure 20. The fins 32 extend away from the array of panels 31 through a central aperture in the lid 34 into the remote region of the tank 10. The lid 34 functions as a baffle to facilitate retention within the bowl structure 20 of cryogenic liquid that is not otherwise retained therein by surface tension, particularly as the space vehicle on which the tank 10 is deployed undergoes accelerations.

A so-called "fill, drain and feed line" 40 is securely fitted in a conventional manner into the outlet duct 21 leading from the aperture at the bottom portion of the bowl structure 20. The tank 10 is filled with cryogenic liquid through the "fill, drain and feed line" 40. After the tank 10 has been filled with cryogenic liquid, the "fill, drain and feed line" 40 is closed by conventional valve means (not shown in the drawing). The tank 10 can be drained through the "fill, drain and feed line" 40 during routine maintenance. In operation, cryogenic liquid is withdrawn as needed from the reservoir region of the tank 10 through the "fill, drain and feed line" 40.

The well for cryogenic liquid that surrounds the outlet duct 21 in the vicinity of the aperture at the bottom portion of the bowl structure 20 is formed by securing a flat ring 41 (as by welding) to end portions of the outlet conduit 14 and the outlet duct 21 before the "fill, drain and feed line" 40 is fitted into the outlet duct 21. The flat ring 41 extends between the outlet conduit 14 and the outlet duct 21, and thereby forms a bottom for the well. Support for the bowl structure 20 within the tank 10 is provided by means of a thermally insulating supporting member 42 (e.g., a ring structure or spoke structure as described hereinafter), which is positioned between the outlet conduit 14 and the outlet duct 21 adjacent the aperture at the apex of the end section 12. The space between the bowl structure 20 and the inner surface of the end section 12, which is indicated by the reference number 43 in FIG. 1, provides a capillary-flow path for cryogenic liquid from the interior of the tank 10 to the well surrounding the outlet duct 21.

In FIG. 2, the thermally insulating supporting member 42 is shown as a flat ring 42' with perforations therein. The flat ring 42' extends between the outlet conduit 14 and the outlet duct 21, and thereby braces the outlet duct 21 against lateral movement with respect to the outlet conduit 14. Cryogenic liquid passes from the space between the bowl structure 20 and the inner surface of the end section 12 into the well surrounding the outlet duct 21 through the apertures in the flat ring 42'. The number of apertures in the flat ring 42', and the size of the apertures, are large enough so that the flat ring 42' provides a very poor heat path from the outlet conduit 14 to the outlet duct 21.

In an alternative embodiment as illustrated in FIG. 3, the thermally insulating supporting member 42 is a generally planar spoke structure 42", which comprises an inner ring positioned around the outlet duct 21 and an outer ring positioned against the inner surface of the outlet conduit 14, with thin spokes extending radially outward from the inner ring to the outer ring. The spokes are of high tensile strength so as to brace the outlet duct 21 against lateral movement with respect to the outlet conduit 14, yet are thin enough to provide a very poor heat path from the outlet conduit 14 to the outlet duct 21. Cryogenic liquid passes into the well that surrounds the outlet duct 21 from the space between the bowl structure 20 and the inner surface of the end section 12 through empty sectors between adjacent spokes of the spoke structure 42".

If required in a particular application, the bowl structure 20 could be further supported within the tank 10 by means of an appropriately positioned support structure that would be suitably configured to provide a poor heat path between the inner surface of the end section 12 and the outer surface of the bowl structure 20. However, for presently contemplated applications, such further support for the bowl structure 20 would not be necessary, because of the high moment of inertia and the attendant bending stiffness of the array of fins 32 attached to the bowl structure 20. The moment of inertia of the fins 32 would oppose any tendency of the bowl structure 20 to move laterally into contact with the inner surface of the end section 12. In an alternative embodiment of a liquid transfer apparatus, which comprises elongate gathering arms defining V-shaped channels as described in co-pending U.S. patent application Ser. No. 07/810,050, the moment of inertia and the attendant bending stiffness would likewise oppose any tendency of the bowl structure 20 to move laterally into contact with the inner surface of the end section 12.

The present invention has been described above in terms of particular embodiments. However, other embodiments within the scope of the invention would be apparent to practitioners skilled in the art upon perusal of the foregoing description and the accompanying drawing. Therefore, the foregoing description and the drawing are merely illustrative of the invention, which is more generally defined by the following claims and their equivalents.

We claim:
1. An apparatus comprising:
 a) tank means defining a reservoir for cryogenic liquid, said tank means having an outlet conduit;
 b) liquid transfer means mounted within said tank means, said liquid transfer means comprising:
  (i) a bowl structure positioned at a capillary distance from an interior wall portion of said tank means to form a gap between said interior wall portion of said tank means and an exterior wall portion of said bowl structure, said gap providing a capillary-flow path for cryogenic liquid from said reservoir toward said outlet conduit of said tank means, said bowl structure having an outlet duct that fits within said outlet conduit of said tank means so that said outlet duct of said bowl structure is spaced apart from said outlet conduit of said tank means to define an annular spacing between said outlet conduit of said tank means and said outlet duct of said bowl structure; and (ii) means mounted on said bowl structure for gathering cryogenic liquid from said reservoir, and for moving cryogenic liquid so gathered toward said outlet duct of said bowl structure;

c) thermally insulating support means positioned in said annular spacing between said outlet conduit of said tank means and said outlet duct of said bowl structure, said thermally insulating support means functioning to secure said bowl structure to said tank means while permitting passage of cryogenic liquid from said gap between said interior wall portion of said tank means and said exterior wall portion of said bowl structure into said annular spacing between said outlet conduit of said tank means and said outlet duct of said bowl structure; and d) an annular member extending between said outlet conduit of said tank means and said outlet duct of said bowl structure, said annular member serving as a bottom for said annular spacing so as to form a well for collecting cryogenic liquid between said outlet conduit of said tank means and said outlet duct of said bowl structure, cryogenic liquid that is collected in said well serving to prevent significant transfer of heat into cryogenic liquid that is being withdrawn from said reservoir via said outlet duct of said bowl structure.

2. The apparatus of claim 1 further comprising flow control means mounted within said bowl structure between said means for gathering cryogenic liquid and said outlet duct of said bowl structure, said flow control means effecting passage of said gathered cryogenic liquid to said outlet duct of said bowl structure at a controlled rate for withdrawal from said reservoir.

3. The apparatus of claim 1 wherein said interior wall portion of said tank means and said exterior wall portion of said bowl structure between which said gap providing said capillary-flow path for cryogenic liquid is formed are generally of hemispheric configuration; and wherein said outlet conduit of said tank means is located at an apex region of said interior wall portion of said tank means, and said outlet duct of said bowl structure is located at an apex region of said exterior wall portion of said bowl structure.

4. The apparatus of claim 3 wherein said outlet conduit of said tank means and said outlet duct of said bowl structure are generally of circularly cylindrical configuration, and are coaxially disposed with respect to each other.

5. The apparatus of claim 1 wherein said means for gathering cryogenic liquid from said reservoir comprises elongate structures extending into said reservoir to conduct cryogenic liquid toward said outlet duct of said bowl structure by capillary action.

6. The apparatus of claim 1 wherein said thermally insulating support means comprises an annular structure extending between said outlet conduit of said tank means and said outlet duct of said bowl structure, said annular structure being perforate to enable cryogenic liquid to pass therethrough into said well.

7. The apparatus of claim 6 wherein said annular structure comprising said thermally insulating support means is a substantially planar perforate annular plate.

* * * * *